United States Patent [19]
Caporizzo

[11] Patent Number: 5,574,495
[45] Date of Patent: Nov. 12, 1996

[54] CABLE TELEVISION DATA PATH ERROR ANALYZER LOCATED AT THE SET-TOP TERMINAL

[75] Inventor: Louis Caporizzo, North Wales, Pa.

[73] Assignee: General Instrument Corporation, Hatboro, Pa.

[21] Appl. No.: 544,469

[22] Filed: Oct. 18, 1995

[51] Int. Cl.⁶ .................................... H04H 1/02
[52] U.S. Cl. ............................ 348/13; 348/12; 348/192
[58] Field of Search .................................. 348/6, 12, 13, 348/192; 375/225; 455/6.1, 5.1

[56] References Cited

U.S. PATENT DOCUMENTS

| | | | |
|---|---|---|---|
| 4,238,779 | 12/1980 | Dickinson et al. | 377/225 |
| 4,509,073 | 4/1985 | Baran et al. | 358/86 |
| 4,535,355 | 8/1985 | Arn et al. | 358/123 |
| 4,623,920 | 11/1986 | Dufresne et al. | 358/122 |
| 4,673,976 | 6/1987 | Wreford-Howard | 358/10 |
| 4,920,533 | 4/1990 | Dufresne et al. | 370/85.2 |
| 5,073,822 | 12/1991 | Gumm et al. | 358/139 |
| 5,142,690 | 8/1992 | McMullan, Jr. et al. | 455/6.1 |
| 5,225,902 | 7/1993 | McMullan, Jr. | 455/5.1 X |
| 5,270,809 | 12/1993 | Gammie et al. | 358/84 |
| 5,394,185 | 2/1995 | Bernard | 348/192 |
| 5,421,031 | 5/1995 | De Bey | 455/5.1 |
| 5,446,918 | 8/1995 | Lamy | 455/5.1 |

*Primary Examiner*—Victor R. Kostak
*Assistant Examiner*—Nathan J. Flynn
*Attorney, Agent, or Firm*—Volpe and Koenig, P.C.

[57] ABSTRACT

A system for determining the quality of data received by settop terminals including at least one settop terminal which analyses each data packet received by the settop terminal and determines whether the received data packet includes errors. The bit error rate is continually calculated, monitored and stored. When the bit error rate exceeds a predetermined threshold, the settop terminal generates a warning signal for transmission to the headend, which diagnoses the problem. The cable system headend utilizes the results from a group of households that have the same problem in order to isolate the source of failure.

23 Claims, 4 Drawing Sheets

CABLE TELEVISION DATA PATH ERROR ANALYZER LOCATED AT THE SET-TOP TERMINAL

BACKGROUND OF THE INVENTION

1. Field of the Invention

This invention relates generally to cable television communication systems. More particularly, the invention relates to a cable television system which determines the quality of data received by settop terminals and utilizes this determination to diagnose system errors without removing the system from service.

2. Description of Related Art

Cable television (CATV) communication networks are being used more frequently for applications that require transmission of data, in addition to analog audio and video information. With the onset of utilizing CATV networks for data-critical applications (such as home banking and shopping) and life-saving applications (such as medical alert and alarm services), transmission of error-free data has become a necessity. Additionally, consumer demand and competition from regional telephone operating companies are forcing all data transmission service providers to provide better quality services.

A primary concern of CATV service providers is the time and costs associated with diagnosing transmission network problems and correcting the problems. Unfortunately, the first indication of a problem within the CATV system is usually the receipt by the CATV network operator of a subscriber complaint. Although a technician may be dispatched to the subscriber's household, the problem may not originate with that particular subscriber's settop terminal. On the contrary, an entire portion of the CATV system may be inoperable. Accordingly, it is difficult for CATV network operators to effectively monitor the operation of the system and to quickly determine the location of problems in order to prevent system-wide failure.

There are known systems that measure different types of interference on a CATV system. One method for measuring the signal-to-noise ratio on a cable television system without taking the system out of service is disclosed in U.S. Pat. No. 5,073,822 (Gamm et al.). This system uses a modified spectrum analyzer for determining signal-to-noise ratios at certain locations within the CATV network. Additionally, U.S. Pat. No. 5,394,185 (Bernard) discloses a technique for utilizing an analyzer to filter out the carrier frequency of the CATV signal and to detect hum caused by the power line and low frequency disturbances. Although both of these systems measure the interference on the CATV transmission network, they do not analyze whether the data received at the settop terminal includes errors. Further, these systems require expensive equipment that would be impractical for a system-wide implementation.

Accordingly, there exists a need for an inexpensive system which accurately detects the error rate of data received by all settop terminals on a CATV network to aid in system diagnostics.

SUMMARY OF THE INVENTION

The present invention comprises a settop terminal which analyses each data packet received by the settop terminal and determines whether the received data packet includes errors. The bit error rate is continually calculated, monitored and stored. When the bit error rate exceeds a predetermined threshold, the settop terminal generates a warning signal for transmission to the headend, which diagnoses the problem. In this case the cable system can utilize the results from a group of households that have the same problem in order to isolate the source of failure.

Accordingly, it is an object of the present invention to provide a system for calculating the bit error rate of data received by CATV settop terminals and using the error rate to isolate the source of the errors.

Other objects and advantages of the system will become apparent to those skilled in the art after reading the detailed description of a presently preferred embodiment.

DETAILED DESCRIPTION OF THE PREFERRED EMBODIMENT

The detailed description of the preferred embodiment will be described with reference to the figures wherein like numerals represent like elements throughout.

Figure 1:
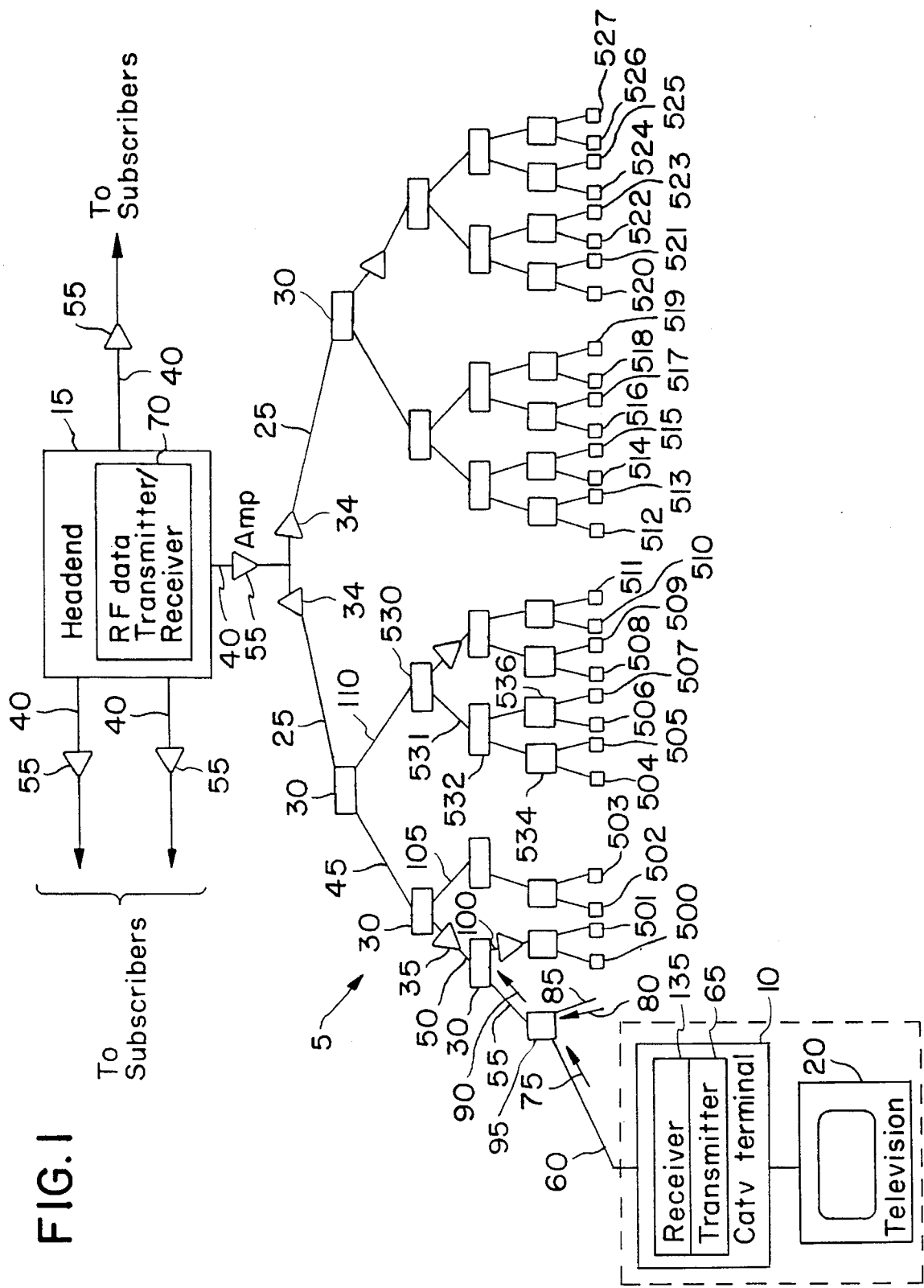
FIG. 1 is a block diagram of a typical CATV transmission network.

Referring to FIG. 1, the topology of a typical CATV transmission network 5 is shown. The network 5 distributes cable television signals originating at the headend 15 to a plurality of subscribers and transmits return messages from each subscriber settop terminal 10 which are received at the headend 15. The CATV network 5 connects a headend 15 to a subscriber's television 20 through a settop terminal 10. The CATV transmission network 5 architecture typically follows a tree-and-branch 25 structure. The headend 15 is at the top of the tree and the settop terminals 10 are located throughout the trunk and branches.

The CATV transmission network 5 begins with a plurality of coaxial or fiber optic trunk lines 40 coupled to the headend 15. Some portions of the CATV plant may use fiber optic cables instead of coaxial transmission cables. Additionally, it is contemplated that the system of the present invention may also be used with microwave links or "wireless" cable television.

At points where the coaxial transmission cable divides, signal splitters/combiners 30 are installed. Line extenders 34 and signal amplifiers 35 are distributed throughout the CATV network 5 to boost transmitted signals and ensure that nominal signal strength levels are maintained. The signal amplifiers 35 are capable of bidirectional amplification. Drop lines 60, branch lines 25, 45, 50, 55 and trunk lines 40 provide the bidirectional transport medium between the headend 15 and all settop terminals 10 within the CATV network 5.

The settop terminal 10 includes a fixed or agile FM receiver 135 and a frequency agile RF data return transmitter 65 which permits a subscriber to communicate with the headend 15 by transmitting messages in the return direction (or upstream) of the CATV network 5. The headend 15 includes a plurality frequency agile RF data transmitter/ receivers 70 for transmitting data to and receiving data from a plurality of subscribers.

Subscribers are typically authorized access to specific CATV channels by subscribing to and paying for CATV services. Accordingly, when a subscriber does not receive a channel that they are authorized to receive, the CATV network operator typically receives a complaint from an irate subscriber. Unless the problem is a system-wide failure, the CATV network operator will not know the exact cause of the problem until a technician is dispatched to assess and to correct the problem. This increases subscriber frustration and dissatisfaction with CATV service.

As shown in FIG. 1, a service problem may originate from one of a plurality of sources. Downstream transmissions from the headend 15 to the CATV settop terminal 10 are susceptible to noise introduced along the trunks 40, branches 25, 45, 50, 55, and drop lines 60. There are four types of noise that may impair data transmission: 1) thermal noise occurring in electronic components due to the change in temperature of the components; 2) cross-talk resulting from the undesired energy appearing in one signal path as a result of coupling to another signal path; 3) intermodulation noise derived from a portion of the desired signal when the signal is passed through a nonlinear device, such as an amplifier; and 4) impulse noise resulting from electrical sparks, electrical and mechanical switching flash-overs, lightening or other sources. Errors may also be introduced into the transmitted data by malfunctioning transmission equipment, such as splitters 30, amplifiers 35 or taps 95, a malfunctioning headend component, or a malfunctioning settop terminal 10. Alternatively, the problem may originate at the headend 15 or from the subscriber's settop terminal 10.

Many of the problems experienced by the CATV network 5 may be the result of a gradual degradation in the performance of the coaxial cable or equipment. Accordingly, it would be desirable to detect problems before they result in catastrophic failure of the component, thereby resulting in a complete loss of CATV services to the subscriber.

The system of the present invention detects problems with the CATV transmission network 5 before a subscriber is aware of the problem. The system also detects a gradual degradation of components within the CATV transmission network 5 which cause data errors before a catastrophic failure of the components.

Figure 2:
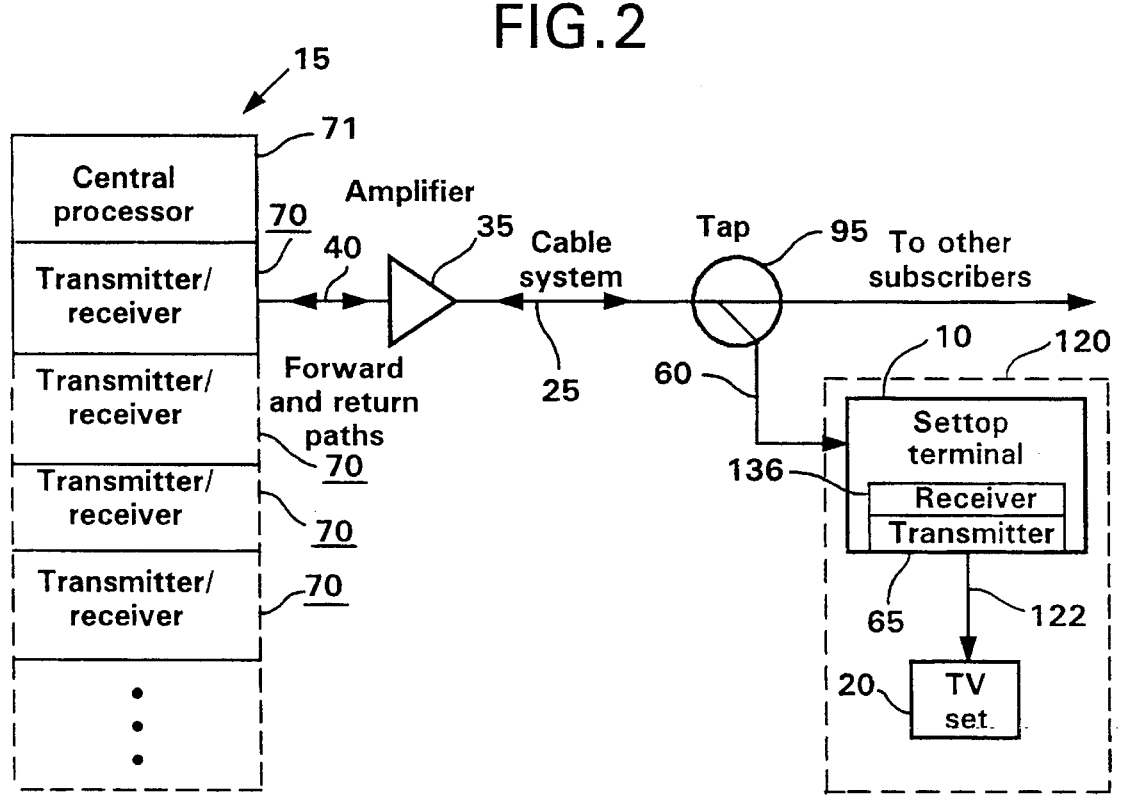
FIG. 2 is a simplified block diagram of the communication path between a subscriber and the headend.

A simplified block diagram of the communication path between a subscriber and the headend 15 is shown in FIG. 2. The transmitter/receivers 70 (transceivers) transmit analog and/or digital video, audio and data signals from the headend 15 to a subscribers's installation 120 which typically comprises a settop terminal 10 and a television 20, or a VCR (not shown). The plurality of transceivers 70 at the headend 15 transmit programming on a plurality of CATV broadcast channels as assigned by the CATV network operator. Additionally, a dedicated data-only channel is provided over a control data channel (CDC). The plurality of channels are combined by a combiner (not shown) for transmission over the CATV network 5. The headend 15 also includes a central processor 71 which generates all communications originated at the headend 15 and receives all incoming messages from subscribers. The central processor 71 may transmit messages to the subscribers in several ways. First, the CDC may be used to transmit addressability data to a plurality of subscribers or to only one subscriber as is well known in the art. Additionally, the central processor 71 may insert data on an available line of the vertical blanking interval (VBI) of a television signal on any CATV broadcast channel.

Figure 3:
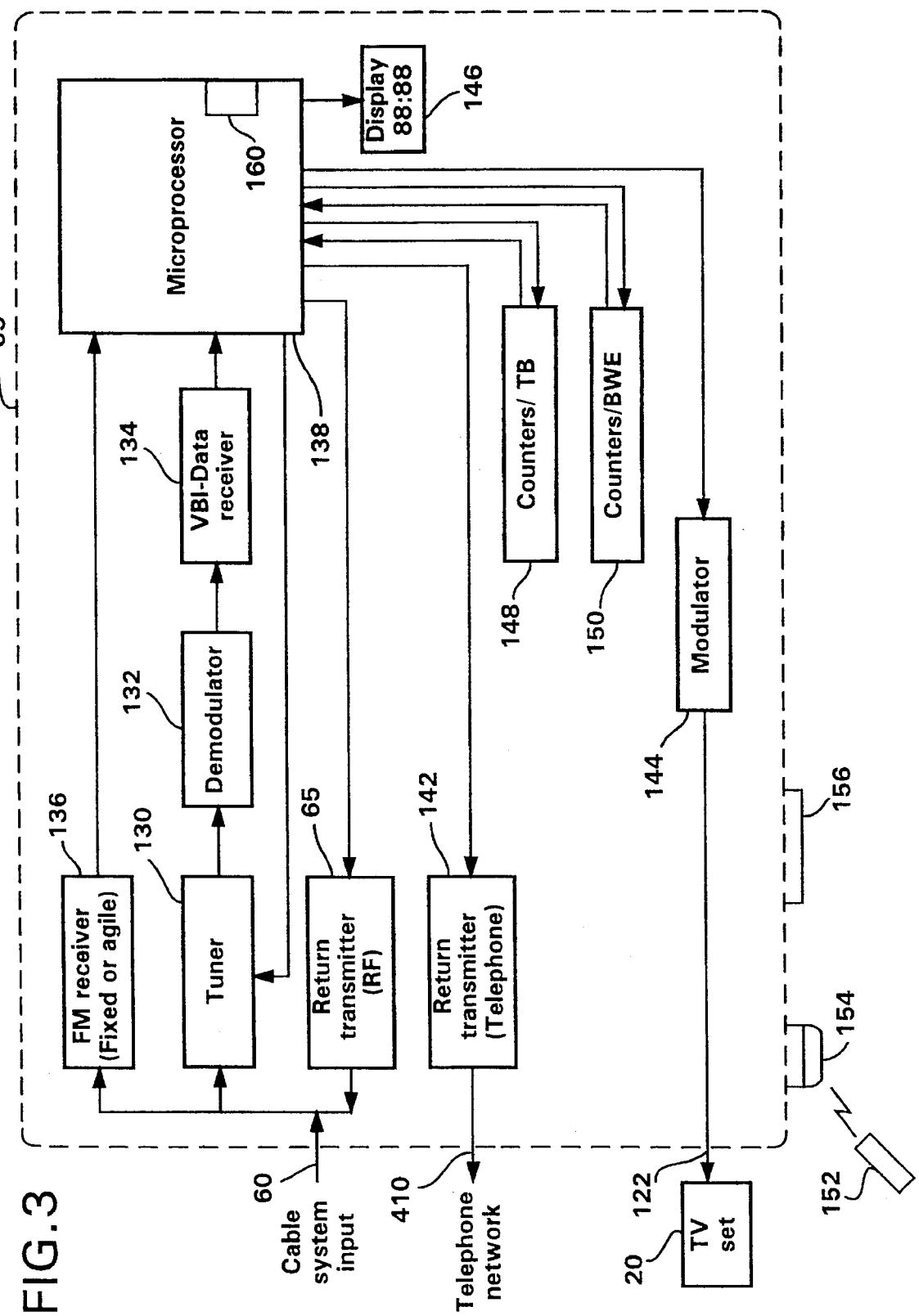
FIG. 3 is the preferred embodiment of the settop terminal of the present invention.

Referring to FIG. 3, the preferred embodiment of the settop terminal 10 of the present invention is shown. A subscriber utilizes the CATV settop terminal 10 to tune to a desired channel and view the selected programming via the television set 20. The settop terminal 10 receives an input signal from the CATV dropline 60. The tuner 130 tunes to the channel desired by the subscriber and removes the carrier frequency. A demodulator 132 and a VBI data receiver 134 extract the VBI data from the analog audio and video (A/V) signals. The analog A/V signals are then forwarded by the microprocessor 138 to the modulator 144 which places the A/V signals on a selected RF carrier frequency, typically television channel 3 or 4, for input to the television set 20.

An FM receiver 136, which may be fixed or agile, is tuned to the CDC which transmits data originating at the headend 15. This data typically includes addressability data streams and other data sent from the CATV network operator to the subscribers. A detailed explanation of the function of the CDC, which is well known to those skilled in the art is outside the scope of this description. As in conventional CATV settop terminals, an LED or LCD display 146 indicates the channel to which the subscriber is currently tuned. In the present invention, the display 146 also enables the CATV network operator to provide messages and other information to the subscriber as will be described in detail hereinafter. The settop terminal 10 may be controlled via an infrared IR transmitter 152 and receiver 154, or via a plurality of push-button keys 156.

The data to be monitored by the preferred embodiment of the present invention is embedded at the headend 15 within the VBI of a television signal. As is well known to those skilled in the art, the VBI may include special reference signals that are located on various lines of the VBI. Several common signals include the vertical interval test signal (VITS), vertical interval reference signal (VIRS), and the close caption signal (CC). In the present invention, data, such as addressability or tag data, is embedded by the headend 15 in the VBI to be sent to a subscriber. The data may be placed on available lines of the VBI. As data is received by the microprocessor 138, the total number of received bytes are counted by a first counter 148. The microprocessor 138 then determines whether or not the received bit of data contains an error.

There are many methods available to detect errors in a received bit stream. In parity error checking, a bit is appended onto each character transmitted to make the transmitted character an even number or an odd number depending on whether the error checking is even parity or odd parity. For example, the character 110100 is to be transmitted in even parity. Since it contains three 1s, (an odd number), to make the number even the bit appended onto the character is a 1.

In a second type of error detection, cyclic redundancy checking (CRC), a specific CRC value is determined at the transmitting end by generating an Nth order polynomial. The receiving end receives the transmitted data and regenerates the polynomial. The result of the polynomial is compared to the specific CRC value. If the values are identical, the message is accepted as error-free. If the receiving end computes a value different from the specific CRC value, then there was an error in the received message.

In the preferred embodiment, the checksum is transmitted once with each variable-length downstream message. A checksum permits the transmission of one or more bytes of data with each transmitted checksum. It would be well known to those skilled in the art that other types of error checking may be employed without departing from the spirit and scope of the present invention.

Figure 4:
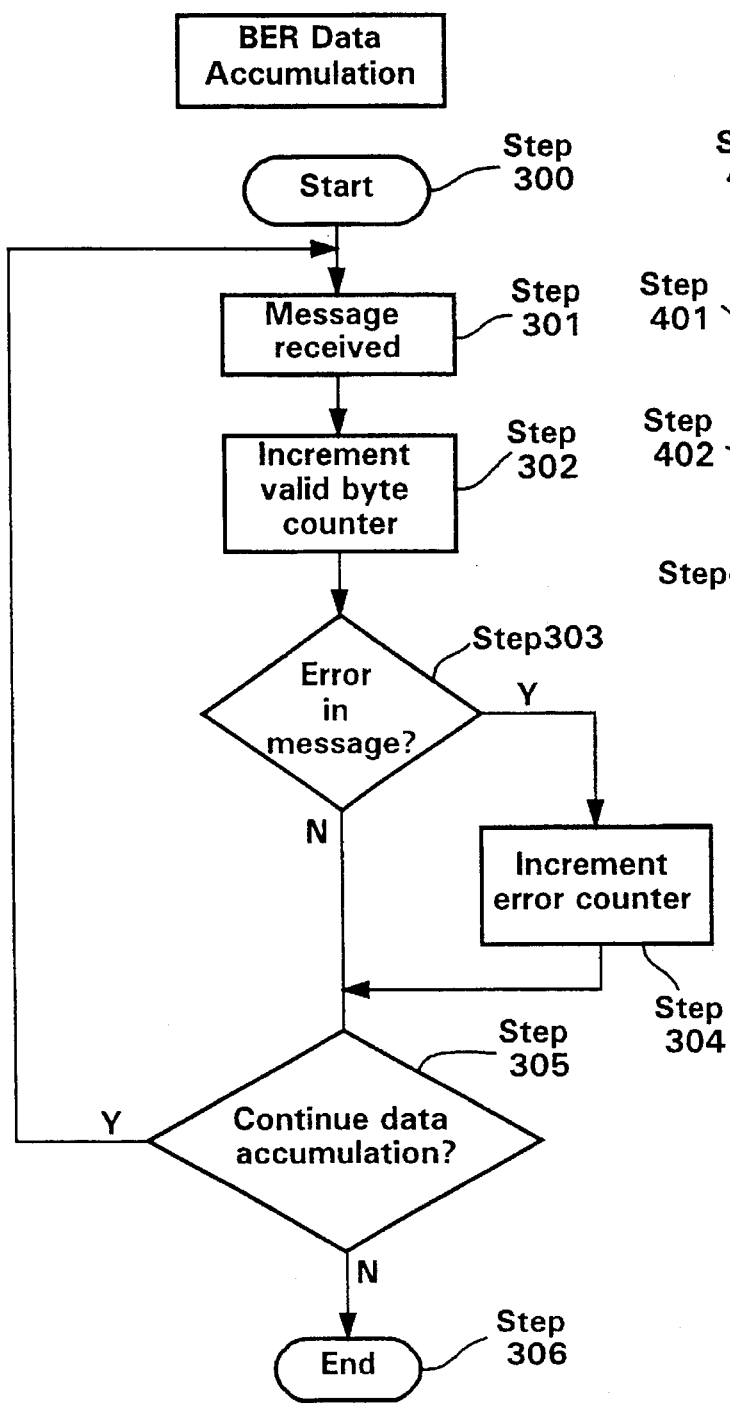
FIG. 4 is a flow diagram of the method for accumulating bit error rate data.

The method for accumulating bit error rate data is shown in FIG. 4. The data accumulation procedure may be initiated (step 300) on demand by the headend 15, on demand by the subscriber via the settop terminal 10, or periodically by the headend 15 or the settop terminal 10. Additionally, each settop terminal 10 may be separately polled, or a system-wide error check may be simultaneously initiated on all settop terminals 10 by the headend 15. After initiation, as each byte of data is received (step 301) by the VBI data receiver 134 and forwarded to the microprocessor 148 the valid byte counter 148 is incremented (step 302). As described previously, the microprocessor 138 determines whether there is an error in the received message (step 303). If an error has been detected, the error counter 150 is incremented (step 304). If no error has been detected in the received message (step 303) the counter 150 is not incremented. At step 305, if data accumulation is to continue, steps 301–304 are repeated. Otherwise, the values accumulated in the counters 148, 150 are stored in memory 160, thus completing the procedure (step 306).

Figure 5:
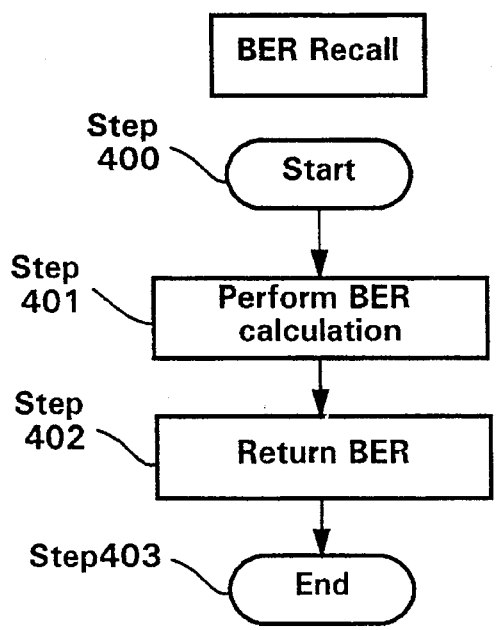
FIG. 5 is a flow diagram of the procedure for calculating the bit error rate.

The settop terminal 10 calculates the bit error rate (BER) using the procedure shown in the flow diagram of FIG. 5. As with the BER data accumulation, the BER calculation procedure may be initiated (step 400) on demand by the headend 15, on demand by the subscriber via the settop terminal 10, or periodically by either the headend 15 or the settop terminal 10. Once the process has been initiated (step 400) the microprocessor 138 retrieves from memory 160 the values accumulated for total bytes and bytes with errors (step 401). The microprocessor 138 then performs the BER calculation (step 402). In the preferred embodiment, this calculation is a simple algorithm comprising dividing the bytes with errors by the total number of bytes. This value may be stored in memory 160 or forwarded to the headend 15 via an RF return transmitter 140, if so equipped. Alternatively, the settop terminal 10 may prompt a subscriber via the display 146 to call the CATV network operator and provide the operator with the displayed BER data.

In an alternative embodiment, referring back to FIG. 3, the settop terminal 10 is coupled to the telephone network 410 via a telephone return transmitter 142 which includes modem means (not shown) for automatically dialing the phone number of the headend 15 and forwarding the BER data to the headend 15.

In the preferred embodiment, the settop terminal 10 detects and determines the BER on the channel currently viewed by the subscriber. The BER may be calculated for any time duration (e.g. five minutes, ten minutes or one hour) or continuously, and stored in memory 160. The central processor 71 may also instruct the settop terminal 10 to determine the BER on selected CATV channels whenever the subscriber terminal is not turned ON. Accordingly, the BER of every channel may be monitored by the CATV network operator daily, hourly or even more frequently. As a result, BER data may be collected for every channel and at every time during the day. The accumulated data provides the CATV network operator with an invaluable diagnostic tool for detecting and preventing CATV network problems.

For example, system-wide BERs may increase during certain times of the day due to atmospheric conditions, or may be greater on certain frequencies due to interference caused by external RF energy sources. The CATV network operator, determining that certain portions of the spectrum are more susceptible to external RF interference, thus causing higher BERs than other portions of the spectrum, may reassign CATV channels to other portions of the spectrum.

In the preferred embodiment, the headend 15 includes a database of the entire CATV network topology. As part of the cable system customer database each subscriber is identified by specifying a specific address. For example, a settop terminal 10 located on cable system trunk number 2, line extender 1, with settop Ser. number 7784 will have a terminal identification number of 217784. By polling and receiving inputs from subscribers fed from the same trunk line extender, the determination of the branch with the error could easily be determined by using a deduction method. Once the branch has been identified, all of the converters on the branch can be identified. By using a second deduction method, a subscriber or a series of subscribers with unacceptably high BERs can be easily identified, thus isolating the failing component.

Referring again to FIG. 1, if the BERs for subscribers 504–511 are abnormally high, and the BERs for subscriber 500–503 and 512–527 remain within average parameters, components 110 and 530 are the likely cause of the problem. Accordingly, a repair technician will be immediately dispatched to this location to perform a diagnostic test of these CATV transmission network components. As a second example, if subscribers 504–507 are experiencing high BERs, yet subscribers 508–511 are not, the problem most likely originates with components 531 and/or 532. One skilled in the art would understand that a simple computer program could be used to automatically identify the most likely problem components.

It should be appreciated that the value of an "acceptable" BER depends upon the particular data transmission application. Bit error rates must be extremely high before the errors are perceived by humans. However, a critical data transmission application, for example, home shopping, ticket purchasing, or home banking will require a BER much lower than that perceived by humans. Accordingly, the CATV network provider will be able to diagnose and correct many CATV system faults even before subscribers notice a degradation in service.

In an alternative embodiment, the settop terminal 10 may initiate a procedure for determining the BER of upstream communications sent from the settop terminal 10 to the headend 15. In this embodiment, the settop terminal 10 generates a message and transmits this message to the headend 15. In the same manner as described for the preferred embodiment, the central processor 71 within headend 15 includes means 70 for receiving the message, detecting errors, calculating the BER and forwarding the BER back to the settop terminal 10. Accordingly, if it is critical that particular transmission be sent error-free from the settop terminal 10 to the headend 15, the subscriber may initiate the process for checking the BER of the upstream transmission path prior to sending the transmission. If the BER exceeds a predetermined threshold, the transmission will not be sent.

Although the invention has been described in part by making detailed reference to certain specific embodiments, such details are intended to be instructive rather than restrictive. It will be appreciated by those skilled in the art that many variations may be made in the structure and mode of operation without departing from the spirit and scope of the invention as disclosed in the teachings herein.

What is claimed is:

1. A cable television transmission system, which transmits programming over a plurality of channels, including a data path analyzer comprising:

a headend comprising:
- means for transmitting analysis data over at least one selected CATV channel to a plurality of settop terminals,
- means for receiving a return signal from each of said plurality of settop terminals; and
- means for analyzing said return signals; and a plurality of settop terminals each comprising:
- means for receiving said analysis data over said selected channel;
  - means for determining whether said received data includes errors;
  - means for calculating the error rate of the received data; and
  - means for generating a return signal to said headend which includes the error rate of said received data.

2. The system of claim 1 wherein said analysis means diagnoses the source of the errors within the transmission system by repetitive reduction.

3. The system of claim 1 wherein said analysis data is embedded in the vertical blanking interval (VBI) of a television signal and said selected channel is a broadcast channel.

4. The system of claim 1 wherein said analysis data is embedded in an addressability data stream and said selected channel a control data channel.

5. The system of claim 1 further including means for sequentially selecting a plurality of CATV channels located throughout the CATV frequency spectrum for analysis.

6. The system of claim 5 wherein said selection means periodically repeats the selection process at predetermined times.

7. The system of claim 1 further including first counter means for counting the total number of received bytes of data and second counter means for counting the number of received bytes of data with errors.

8. The system of claim 6 wherein said calculating means includes a processor which divides the number of received bytes of data with errors by the total number of received bytes of data to determine said error rate.

9. The system of claim 8 wherein said first counter means stores said total number of received bytes of data and said second counter means stores the number of received bytes of data with errors.

10. A method for detecting component failure in the data path of a cable television transmission system which includes a headend, which transmits programming over a plurality of channels, and at least one settop terminal, comprising the steps of:

transmitting analysis data downstream from the headend over at least one selected CATV channel to at least one settop terminal, receiving said analysis data at said settop terminal over said selected channel;

determining whether said received data includes errors;

calculating the error rate of the received data;

transmitting a return signal, including the error rate of said received data, from said settop terminal to said headend, receiving said return signal from said settop terminal; and analyzing said return signals to isolate the failing component.

11. The method of claim 10 further comprising embedding said analysis data in the vertical blanking interval (VBI) of a television signal prior to transmission.

12. The method of claim 10 further comprising embedding said analysis data in an addressability data stream of a control data channel.

13. The method of claim 10 further comprising sequentially selecting a plurality of CATV channels located throughout the CATV frequency spectrum for analysis.

14. The method of claim 13 wherein said step of calculating further includes dividing the number of received bytes with errors by the total number of received bytes to determine said error rate.

15. The method of claim 13 wherein said selecting step is periodically repeated.

16. A settop terminal for use with a cable television transmission system which transmits programming over a plurality of channels; the system including a headend comprising means for transmitting analysis data over at least one selected CATV channel to a plurality of settop terminals, means for receiving a return signal from each of said plurality of settop terminals, and means for analyzing said return signals; the settop terminal comprising:

means for receiving said analysis data over said selected channel;

means for determining whether said received data includes errors;

means for calculating the error rate of the received data; and means for generating a return signal to said headend which includes the error rate of said received data.

17. The settop terminal of claim 16 wherein said analysis data is embedded in the vertical blanking interval (VBI) of a television signal and said receiving means further includes means for extracting said data.

18. The settop terminal of claim 16 wherein said analysis data is embedded in an addressability data stream of the control data channel and said receiving means further includes means for extracting said data.

19. The settop terminal of claim 16 further including a tuner which sequentially selects a plurality of CATV channels located throughout the entire frequency spectrum for analysis.

20. The settop terminal of claim 16 wherein said calculating means divides the number of received bytes with errors by the total number of received bytes to determine said error rate.

21. The settop terminal of claim 16 further including first counter means for counting the total number of received bytes of data and second counter means for counting the number of received bytes of data with errors.

22. The system of claim 21 wherein said calculating means includes a processor which divides the number of received bytes of data with errors by the total number of received bytes of data to determine said error rate.

23. The system of claim 22 wherein said first counter means stores said total number of received bytes of data and said second counter means stores the number of received bytes of data with errors.

* * * * *